Feb. 3, 1931.  L. WITTENBERG  1,791,109
PROCESS OF PREPARING ROAD BUILDING AGGREGATE
Filed Feb. 4, 1927
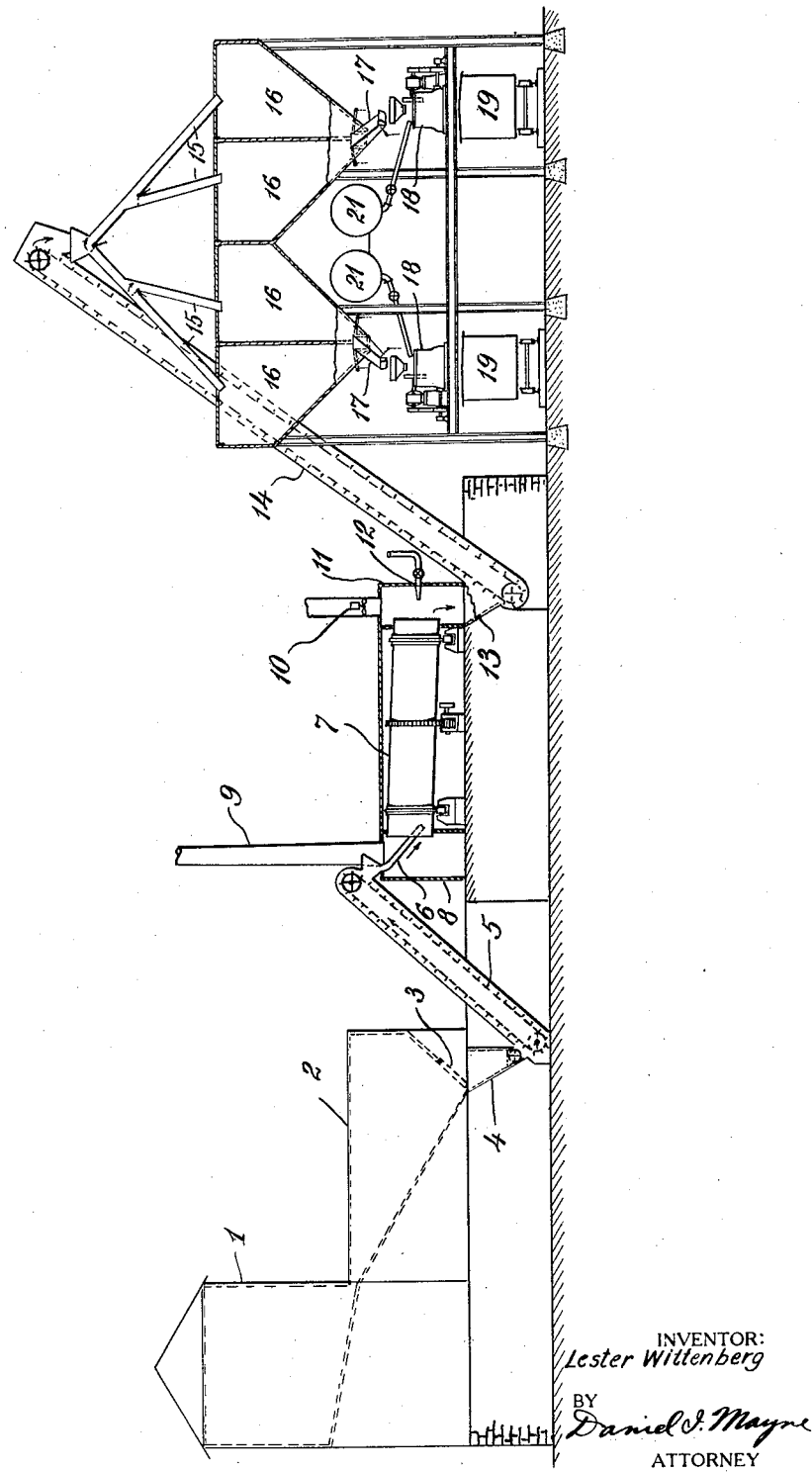
INVENTOR:
Lester Wittenberg
BY
Daniel J. Mayne
ATTORNEY Patented Feb. 3, 1931

1,791,109

UNITED STATES PATENT OFFICE

LESTER WITTENBERG, OF NEW ROCHELLE, NEW YORK, ASSIGNOR TO THE BARRETT COMPANY, OF NEW YORK, N. Y., A CORPORATION OF NEW JERSEY

PROCESS OF PREPARING ROAD-BUILDING AGGREGATE

Application filed February 4, 1927. Serial No. 165,765.

This invention relates to road-building materials and relates particularly to road aggregate coated with a bitumen, such as pitch or asphalt, and a process of producing such a material.

I am aware, of course, that it has been known for years that stone can be coated with bitumen for the preparation of a road-building material, the practice previously having been to heat the stone to a temperature considerably above the melting or "setting" point of the coating material and without any further substantial cooling to mix the molten coating material therewith. This hot process has the disadvantage that the coating material still being liquid or semi-liquid when the aggregate is removed from the mixer and remaining so for several hours thereafter due to the high temperature and heat capacity of the stone becomes distorted because of the flow of the coating due to gravity and leaves an uneven coating of bitumen upon the stone.

I am also aware of the practice of mixing stone having atmospheric temperature with hot or cold bitumen. This cold process has the disadvantage that the moisture which is absorbed or occluded in the stone is not removed prior to the coating thereof with bitumen and the coating will not properly adhere to the stone.

My improved process is characterized by the fact that I heat the stone to be coated well above the boiling point of water so as to substantially completely remove all moisture from the stone, then allow the stone to cool or mechanically cool it to a temperature substantially that at which the coating to be used will adhere to the stone without substantially flowing, namely, will take a substantial "set". The stone at this temperature is then thoroughly mixed with the coating material, the latter having a temperature sufficiently high to give it proper fluidity and adhesive qualities.

In the single figure of the drawing in which like reference characters refer to like parts, I have diagrammatically illustrated a plant lay-out of apparatus which may be employed to carry out my improved process, although various modifications thereof may be employed.

In the drawing, reference character 1 designates a storage bin for crushed stone which is to be coated. This bin may be divided into a number of compartments for various grades or kinds of stone, the compartments being so arranged that the stone therein may be fed from any one into the transfer bin 2. The transfer bin 2 is provided with a sliding gate 3 to permit regulated quantities of stone to be conducted through the shute 4 to the elevating conveyer 5 which discharges the stone in regulated quantities into the shute 6.

Through the shute 6 the stone may pass into a long cylindrical rotary drier 7 of any well known type. As the stone passes through this rotary drier, it is met by a counter current of hot air of sufficient temperature to drive out of the stone substantially all moisture which may be absorbed or occluded therein and of sufficient velocity to carry from the drier the dust which is freed from the stone because of the drying operation and because of the agitation of the stone in the rotary drier 7. This current of air conducts the moisture and dust into the chamber 8, the moisture and at least part of the dust passing up the stack 9 and possibly some of the dust settling in the chamber 8 from which it may be periodically removed in any well known manner.

The current of air which is supplied to the drier 7 may be cool upon entering the drier and the drier heated directly by any well known means, although it is more preferable to supply a hot current of air to the drier 7 through the chamber 11 by means of blower 10, the air being preheated in any well known manner before entering the chamber 11 or being heated in the chamber 11 by well known means, such as, an oil burning jet 12.

The stone drops from the lower end of the drier 7 into the trough 13 which conducts the stone to the enclosed elevating conveyer 14 which discharges the heated and substantially moisture free stone into spouts 15 which conduct the stone to covered bins 16. The spouts 15 may be controlled by butterfly valves diagrammatically shown so as to admit any particular grade or amount of stone into any particular bin 16. These bins 16 may be provided with controlled vents to assist or retard cooling as may be desired.

The bins 16 empty into valve controlled chutes 17 which permit the stone to be transferred in measured quantities into the mixers 18, which mixers may discharge by gravity into cars or trucks 19 for shipment or into other storage that may be provided. Tanks 21 which may be heated by suitable well known means are provided for the coating bitumen, such as, pitch or asphalt. In the tanks 21 the bitumen is heated to a temperature somewhat above that at which the bitumen will set or become firm, being a temperature sufficient to give the bitumen proper fluidity for mixing with the stone, as well as to reduce its viscosity to give it proper adhesive qualities. From the tanks 21 the bitumen may be admitted to the mixer 18 in regulated quantities for coating the stone.

In the bin 16 the stone is allowed to cool to the desired temperature before being transferred to the mixers 18. Although I do not desire to be limited to any particular temperatures for the stone inasmuch as same varies, depending upon the coating material, it may be stated that where the stone is to be coated with pitch which has a melting point of 110° F. (determined by the cube method) that the stone should have a temperature of about 140° F. when admitted to the mixer 18 and that the pitch should be admitted to the mixer 18 at a temperature of about 180° F. i. e. somewhat above the melting point of the pitch. Thus, in accordance with this invention, mineral material at a temperature not exceeding 140° F. is admixed with bitumen, in the embodiment of the invention herein described, of a melting point of 110° F. at a temperature not exceeding 180° F. to form the aggregate. I have also found it suitable when employing the above materials at the approximate temperatures designated to form the aggregate from a mixture of about 2000 pounds of 1½ inch stone and of about 80 pounds of pitch. The smaller the stone, the more pitch required. Obviously, various melting point pitches may be used, as well as asphalt when found suitable. Under ordinary circumstances, the process is a continuous one and the mixer 18 would have a temperature substantially that of the stone when admitted thereto. Even if the mixer 18 is cold when the stone is admitted thereto, the mixer would soon attain a temperature close to that of the stone.

It will thus be seen that a substantially dust and moisture free stone is conducted to the mixer 18 and that when the bitumen is mixed with the stone a uniform coating of the bitumen will be deposited upon the stone and substantially immediately "set" because of the lower temperature and large heat absorbing capacity of the stone.

Because substantially all the moisture and dust have been removed from the stone, the bituminous coating will firmly adhere thereto and because the coating "sets" substantially instantaneously, the desired thickness of coating will be obtained inasmuch as the aggregate is not hot enough to allow the coating to flow thereon or therefrom.

In the above description and in the claims appended hereto, the term "aggregate" refers to the finished product, namely, the stone which has been coated according to my improved process, the term "stone" refers to those road-building materials, such as, limestone, slag, etc., which are well known to those skilled in the art and the term "set" refers to that transition condition of the coating material between liquid and solid while cooling at which the viscosity thereof upon the stone first becomes such that no substantial flow of the coating occurs due to gravity.

I claim:—

1. The step in the process of preparing road-building aggregate which comprises mixing stone and bitumen while the bitumen is fluid and while the stone has a temperature approximately equal to that at which the bitumen will set.

2. The step in the process of preparing road-building aggregate which comprises mixing stone and bitumen, the bitumen contacting with the stone while the stone has a temperature of approximately that at which the bitumen will set and while the bitumen has a temperature somewhat above that at which the bitumen will set.

3. The step in the process of preparing road aggregate which comprises mixing stone which has a temperature of approximately 140° F. and pitch which is fluid and which has a temperature of approximately 180° F.

4. The step in the process of preparing road aggregate which comprises mixing stone which has a temperature of approximately 140° F. and pitch which is fluid and which has a temperature of approximately 180° F. in the proportion of approximately 200 parts stone and at least 8 parts pitch.

5. The process of preparing road-building aggregate which comprises heating stone to a temperature above the boiling point of water and mixing the stone with bitumen while the bitumen is fluid and while the stone has a temperature approximately equal to that at which the bitumen will set.

6. The process of preparing road-building aggregate which comprises heating stone until substantially all of the moisture is driven therefrom and mixing the stone with bitumen, the bitumen contacting with the stone while the stone has a temperature of approximately that at which the bitumen will set and while the bitumen has a temperature somewhat above that at which the bitumen will set.

7. The process of preparing road aggregate which comprises heating stone until substantially all of the moisture is driven therefrom and mixing the stone while it has a temperature of approximately 140° F. with approximately 110° F. melting point pitch which is fluid and which has a temperature of approximately 180° F.

8. The process of preparing road aggregate which comprises heating stone until substantially all of the moisture is driven therefrom and mixing the stone while it has a temperature of approximately 140° F. with approximately 110° F. melting point pitch which is fluid and which has a temperature of approximately 180° F. in the proportion of approximately 200 parts stone and at least 8 parts pitch.

9. The process of preparing road-building aggregate, which comprises agitating stone in a current of warm air until substantially all of the moisture is driven therefrom and mixing the stone with bitumen while the bitumen is fluid and while the stone has a temperature lower than that of the fluid bitumen with which it is admixed and at a temperature approximately equal to that at which the bitumen will set.

10. The process of preparing road-building aggregate which comprises heating stone until substantially all of the moisture is driven therefrom, cooling the stone to a temperature approximately equal to that at which the bitumen with which the stone is to be mixed will set and mixing the stone with said bitumen while the bitumen is fluid.

11. The process of preparing road-building aggregate which comprises heating stone until substantially all of the moisture is driven therefrom and mixing the stone with bitumen while the bitumen is fluid and while the stone has a temperature approximately equal to that at which the bitumen will set.

12. The process of preparing road-building aggregate which comprises drying stone and mixing the dried stone with bitumen at such temperature that the bitumen will set substantially immediately upon admixture with said stone.

13. The step in the process of preparing road-building aggregate which comprises mixing stone with bitumen having a melting point of about 110 F. while the bitumen is heated to about 180° F. and while the stone is at a temperature of approximately 140° F.

14. The process of preparing road-building aggregate which comprises heating stone until substantially all of the moisture is driven therefrom, cooling the stone to a temperature not exceeding 140° F. and then mixing the cooled stone at a temperature not exceeding about 140° F. with a fluid bitumen at a temperature not exceeding about 180° F.

15. The step in the process of preparing road-building aggregate which comprises mixing fluid bitumen at a temperature not exceeding about 180° F. with dried stone at a temperature below about 140° F. whereby the bitumen will set to form an even coating upon said stone.

16. The process of preparing road-building aggregate which comprises heating stone to a temperature above the temperature fluid bitumen with which the stone is admixed and until substantially all of the moisture is driven therefrom, cooling the stone to a temperature below the temperature of said fluid bitumen, and then mixing the cooled stone with said fluid bitumen.

In testimony whereof I affix my signature.

LESTER WITTENBERG.

CERTIFICATE OF CORRECTION.

Patent No. 1,791,109.             Granted February 3, 1931, to

LESTER WITTENBERG.

It is hereby certified that error appears in the printed specification of the above numbered patent requiring correction as follows: Page 3, line 64, claim 14, after "exceeding" insert about, and line 77, claim 16, after "temperature" insert of the; and that the said Letters Patent should be read with these corrections therein that the same may conform to the record of the case in the Patent Office.

Signed and sealed this 3rd day of March, A. D. 1931.

M. J. Moore,
(Seal)             Acting Commissioner of Patents.